(12) United States Patent
Chen

(10) Patent No.: US 11,251,661 B2
(45) Date of Patent: Feb. 15, 2022

(54) INDUCTIVE POWER TRANSMITTER

(71) Applicant: Apple Inc., Cupertino, CA (US)

(72) Inventor: Liang Chen, Freemans Bay (NZ)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/791,700

(22) Filed: Feb. 14, 2020

(65) Prior Publication Data
US 2020/0204013 A1 Jun. 25, 2020

Related U.S. Application Data

(63) Continuation of application No. 15/548,112, filed as application No. PCT/NZ2016/050008 on Feb. 3, 2016, now Pat. No. 10,566,853.

(60) Provisional application No. 62/234,556, filed on Sep. 29, 2015, provisional application No. 62/111,327, filed on Feb. 3, 2015.

(51) Int. Cl.
*H02J 7/02* (2016.01)
*H02J 50/90* (2016.01)
*H02J 50/12* (2016.01)
*H01F 38/14* (2006.01)
*H02J 50/40* (2016.01)
*H04B 5/00* (2006.01)

(52) U.S. Cl.
CPC ............ *H02J 50/90* (2016.02); *H01F 38/14* (2013.01); *H02J 7/025* (2013.01); *H02J 50/12* (2016.02); *H02J 50/40* (2016.02); *H04B 5/0037* (2013.01); *H04B 5/0081* (2013.01)

(58) Field of Classification Search
None
See application file for complete search history.

(56) References Cited

U.S. PATENT DOCUMENTS

| 6,650,213 | B1 | 11/2003 | Sakurai |
| 9,106,083 | B2 | 8/2015 | Partovi |
| 9,376,027 | B2 | 6/2016 | Harris |
| 9,496,732 | B2 | 11/2016 | Partovi |
| 2005/0068019 | A1 | 3/2005 | Nakamura |
| 2009/0096413 | A1 | 4/2009 | Partovi |
| 2010/0033021 | A1* | 2/2010 | Bennett .............. H02J 50/12 307/104 |
| 2010/0259217 | A1 | 10/2010 | Baarman |
| 2011/0259960 | A1 | 10/2011 | Baarman |
| 2012/0068550 | A1 | 3/2012 | De Boer |
| 2012/0313577 | A1 | 12/2012 | Moes |
| 2013/0030892 | A1 | 1/2013 | Liu |
| 2013/0119773 | A1 | 5/2013 | Davis |
| 2013/0175874 | A1 | 7/2013 | Lou |
| 2013/0285606 | A1 | 10/2013 | Ben-Shalom |

(Continued)

FOREIGN PATENT DOCUMENTS

JP 2009201328 A 9/2009
JP 2010527226 A 8/2010

(Continued)

*Primary Examiner* — Cassandra F Cox
(74) *Attorney, Agent, or Firm* — Fletcher Yoder PC

(57) ABSTRACT

An inductive power transmitter 2 comprising: a plurality of transmitter coils 7; a controller 8 configured to selectively energise the coils 7 in order to couple a receiver 3, the coils 7 selected being dependent on an orientation of the receiver 3, a power transfer optimisation algorithm, or a lookup table.

30 Claims, 21 Drawing Sheets

(56) References Cited

U.S. PATENT DOCUMENTS

| | | |
|---|---|---|
| 2013/0300204 A1 | 11/2013 | Partovi |
| 2014/0091755 A1 | 4/2014 | Walley |
| 2014/0139041 A1 | 5/2014 | Bohori |
| 2014/0191568 A1 | 7/2014 | Partovi |
| 2014/0197687 A1 | 7/2014 | Lin |
| 2015/0236513 A1 | 8/2015 | Covic |
| 2016/0025388 A1 | 1/2016 | Wait |
| 2017/0237296 A1 | 8/2017 | Keith |

FOREIGN PATENT DOCUMENTS

| | | |
|---|---|---|
| JP | 2011205886 A | 10/2011 |
| JP | 2012050209 A | 3/2012 |
| JP | 2012523814 A | 10/2012 |
| JP | 2014023348 A | 2/2014 |
| JP | 2014518502 A | 7/2014 |
| WO | 2008137996 A1 | 11/2008 |
| WO | 2011016737 A1 | 2/2011 |
| WO | 2013122483 A1 | 8/2013 |
| WO | 2014083015 A1 | 6/2014 |

\* cited by examiner

INDUCTIVE POWER TRANSMITTER

FIELD

This invention relates to an inductive power transmitter.

BACKGROUND

Electrical converters are found in many different types of electrical systems. Generally speaking, a converter converts a supply of a first type to an output of a second type. Such conversion can include DC-DC, AC-AC and DC-AC electrical conversions. In some configurations a converter may have any number of DC and AC 'parts', for example a DC-DC converter might incorporate an AC-AC converter stage in the form of a transformer.

One example of the use of converters is in inductive power transfer (IPT) systems. IPT systems are a well-known area of established technology (for example, wireless charging of electric toothbrushes) and developing technology (for example, wireless charging of handheld devices on a 'charging mat').

SUMMARY

The present invention may provide an improved inductive power transmitter or may at least provide the public with a useful choice.

According to one exemplary embodiment there is provided an inductive power transmitter comprising:
a plurality of planar transmitting coils; and
an inverter configured to provide an AC supply signal; and
a plurality of control devices each configured to adjust the AC supply signal provided to a respective transmitting coil;
wherein a direction of a magnetic field generated by the adjusted AC supply signal in the plurality of transmitting coils is configured to substantially couple to an unconstrained inductive power transfer receiver.

According to further embodiments there is provided a transmitter according to any of claim 1, 17, 35, 47, 52 or 54. Any embodiments may be implemented according to any combination of features from any of claims 1 to 64.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any documents in this specification does not constitute an admission that those documents are prior art or form part of the common general knowledge.

BRIEF DESCRIPTION OF THE DRAWINGS

The accompanying drawings which are incorporated in and constitute part of the specification, illustrate example embodiments together with the summary given above, and the detailed description below.

DETAILED DESCRIPTION

IPT systems will typically include an inductive power transmitter and an inductive power receiver. The inductive power transmitter includes a transmitting coil or coils, which are driven by a suitable transmitting circuit to generate an alternating magnetic field. The alternating magnetic field will induce a current in a receiving coil or coils of the inductive power receiver. The received power may then be used to charge a battery, or power a device or some other load associated with the inductive power receiver.

In order for mass adoption of the charging mat for mobile phone charging, various manufactures have attempted to agree on a common standard. This specifies a number of minimum requirements for inductive power transfer to charge portable consumer devices. For example to comply with the Wireless Power Consortium (WPC) Qi 1.1 specification, the device must be placed close with the mat surface.

One option may be to constrain the user to install the device to be charged in a predetermined orientation on the device eg: flat. Another option is If the device orientation was not constrained. However, it may be necessary to provide multiple receiving coils in different orientations, or to provide multiple transmitting coils in different orientations to ensure the transmitting field is adequately coupled. Either option may significantly constrain the device design, and may not be feasible for some markets.

One solution is to use multiple overlapping planar transmitting coils, where the coil voltages are controlled to manipulate the overall field direction. This allows the transmitter mat to be planar, and for the device to have a single receiving coil and to be oriented in any 3D direction. The field direction is then modified to suit. One implementation is for the transmitter circuit to convert from the AC supply to a DC bus, and separate full bridge inverters convert the DC bus voltage to a desired AC voltage magnitude and phase for each transmitting coil.

Figure 1:
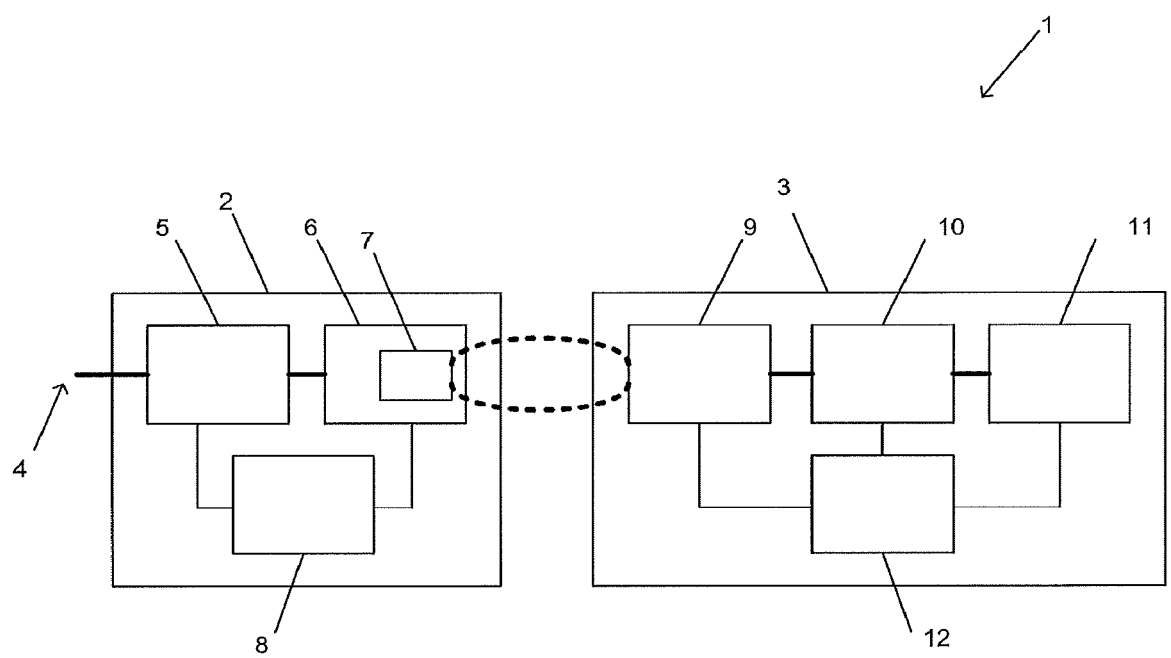
FIG. 1 is a block diagram of an inductive power transfer system.

FIG. 1 shows a representation of an inductive power transfer (IPT) system 1 according to an alternative implementation. The IPT system includes an inductive power transmitter device 2 and an inductive power receiver device 3. The inductive power transmitter 2 is connected to transmitter circuitry which may include one or more of an appropriate power supply 4 (such as mains power) and an AC-DC converter 5 that is connected to an inverter 6. The inverter 6 of the transmitter circuitry supplies a series of transmitting coils 7 with an AC signal so that the transmitting coils 7 generate an alternating magnetic field. In some configurations, the transmitting coils 7 may also be considered to be separate from the inverter 6.

A controller 8 within the inductive power transmitter 2 may be connected to each part of the inductive power transmitter 2. The controller 8 may be adapted to receive inputs from each part of the inductive power transmitter 2 and produce outputs that control the operation of each part. The controller 8 may be implemented as a single unit or separate units. The controller 8 may be adapted to control various aspects of the inductive power transmitter 2 depending on its capabilities, including for example: power flow, tuning, selectively energising transmitting (transmitter) coils, inductive power receiver detection and/or communications.

The inductive power receiver 3 includes a receiving coil or coils 9 that is connected to receiver circuitry which may include power conditioning circuitry 10 that in turn supplies power to a load 11. When the coils 7,9 of the inductive power transmitter 2 and the inductive power receiver 3 are suitably coupled, the alternating magnetic field generated by the transmitting coil or coils 7 induces an alternating current in the receiving coil or coils. The power conditioning circuitry 10 converts the induced current into a form that is appropriate for the load 11. The receiving coil or coils 9 may be connected to (resonance) capacitors (not shown) either in parallel or series to create a resonant circuit. In some inductive power receivers, the receiver circuitry may further include a controller 12 which may, for example, control the tuning of the receiving coil or coils 9, the power supplied to the load 11 by the receiving circuitry and/or communications.

The term "coil" may include an electrically conductive structure where an electrical current generates a magnetic field. For example inductive "coils" may be electrically conductive wire in three dimensional shapes or two dimensional planar shapes, electrically conductive material fabricated using printed circuit board (PCB) techniques into three dimensional shapes over plural PCB 'layers', and other coil-like shapes. The use of the term "coil", in either singular or plural, is not meant to be restrictive in this sense. Other configurations may be used depending on the application.

Figure 2:
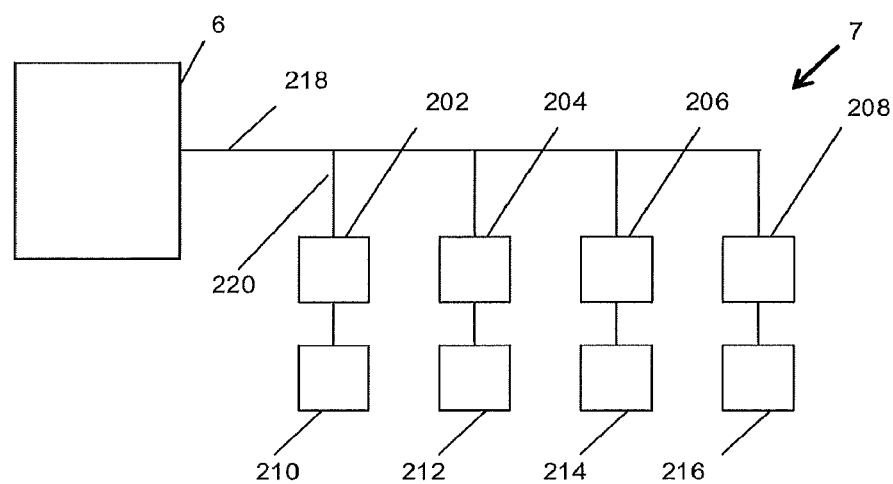
FIG. 2 is a block diagram of an example transmitter.

An example transmitter 2 is shown in FIG. 2. In this embodiment a number of transmitting coils 7 are shown 202,204,206,208 together with the inverter 6. For each coil 202,204,206,208 a respective control device 210,212,214, 216 is provided in series. In this way the magnitude and/or phase of the voltage and/or current from 218 the inverter 6 can be independently adjusted 220 for each coil. This allows the overall magnetic field generated to be controlled in magnitude and/or direction. The coils 202,204,206,208 may be manufactured in a planar, overlapping and/or mutually decoupled arrangement. Thus the magnetic field may be manipulated in 3 dimensions without the use of coils in a third dimension, and without the need for a separate inverter for each coil. This may have the advantage of a simpler circuit, lower component cost, lower losses and/or a smaller footprint.

Figure 3A:
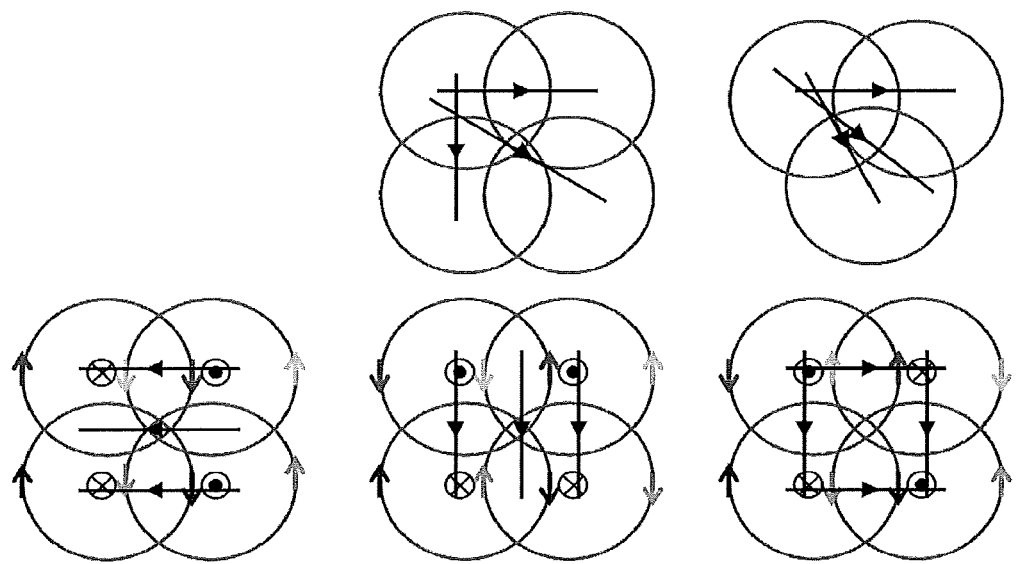
FIGS. 3(a)-(b) are example layouts of the transmitting coils for the transmitter in FIG. 2.
Figure 3B:
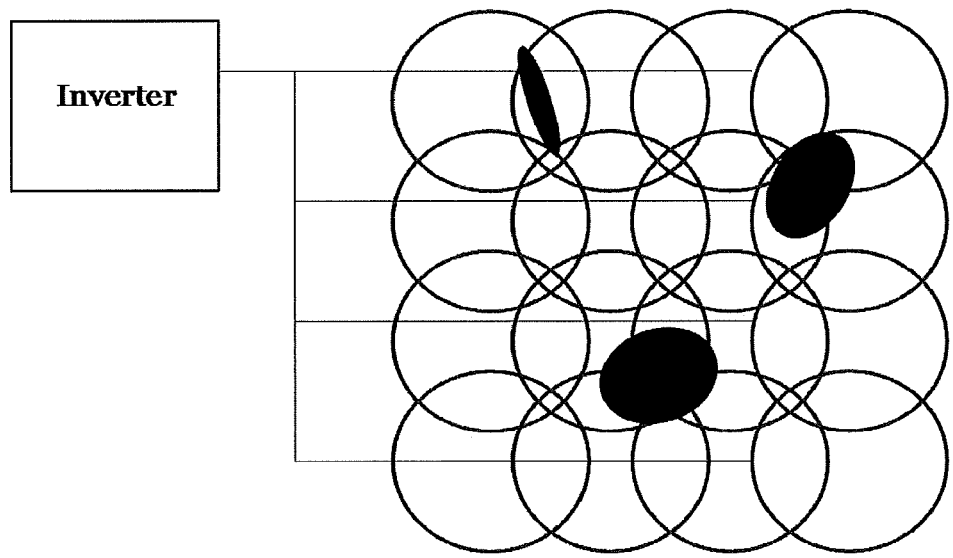

FIGS. 3(*a*) and 3(*b*) show example transmitter coil layouts 300. In FIG. 3(*a*) three and four overlapping coil configurations are shown in a planar arrangement. In this way the coil currents may be adjusted to achieve different magnetic field vectors in given locations on the surface (and above the surface in the Z direction) of the transmitter 2. By varying the current in each coil different field directions can be simulated as shown. The layout in FIG. 3(*b*) with 16 coils allows for more complex field manipulation.

The coils may be operated as shown in FIGS. 4(*a*) to (*d*). The amplitudes and/or phases of the coil currents can be scanned to find the optimized inductive transfer to the receiver. For example in FIG. 4(*a*) two neighbouring overlapping coils are illustrated together with the phases of the currents driving each of the coils and the resultant magnetic fields. The vertical arrows near the centre of each coil, represents the current used to excite each coil. Depending on the relative phase and amplitude relationship between the two currents, the direction of the resultant magnetic field can be manipulated. FIG. 4(*b*) illustrates the simulated magnetic field using magnetic field simulation software JMAG when driven with different phases and amplitudes. FIG. 4(*c*) shows that for every possible receiver coil orientation and position the direction of the generated magnetic fields can be manipulated by controlling the phases and amplitudes of the currents to maximize power transfer. These currents are shown in FIG. 4(*d*).

Figure 5:
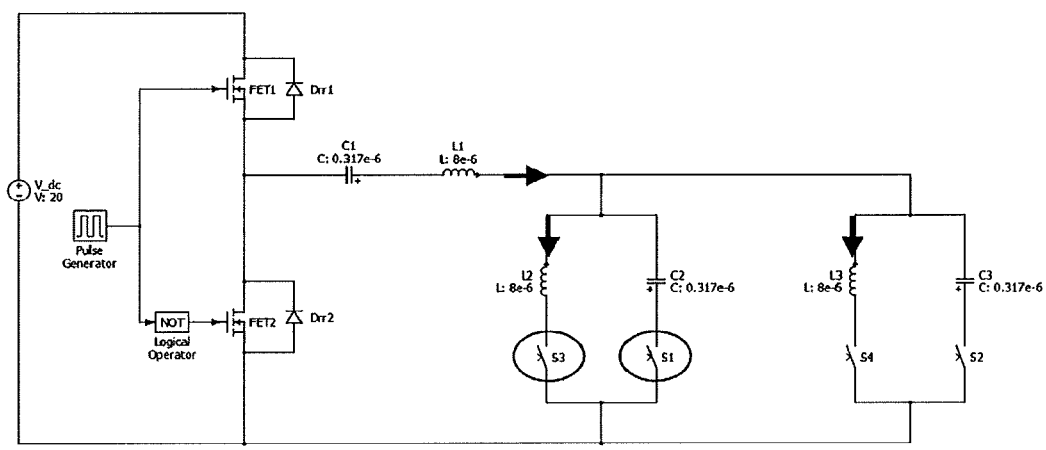
FIG. 5 is a circuit diagram of a first example circuit.

A first example circuit diagram 500 is shown in FIG. 5. The inverter 6 is a half bridge using two MOSFET switches. The inverter 6 supplies an AC voltage to an AC filter $L_1$ $C_1$. Each transmitting coil $L_2$ $L_3$ is connected in parallel to the filtered AC voltage bus. Each coil has one or more control devices associated with it. A first branch includes an AC switch $S_3$ $S_4$ in series with each respective coil $L_2$ $L_3$ to control the coil current magnitude. A second branch in parallel with the first includes a capacitor $C_2$ $C_3$ in series with a respective AC switch $S_1$ $S_2$, to control the coil current phase.

Figure 6A:
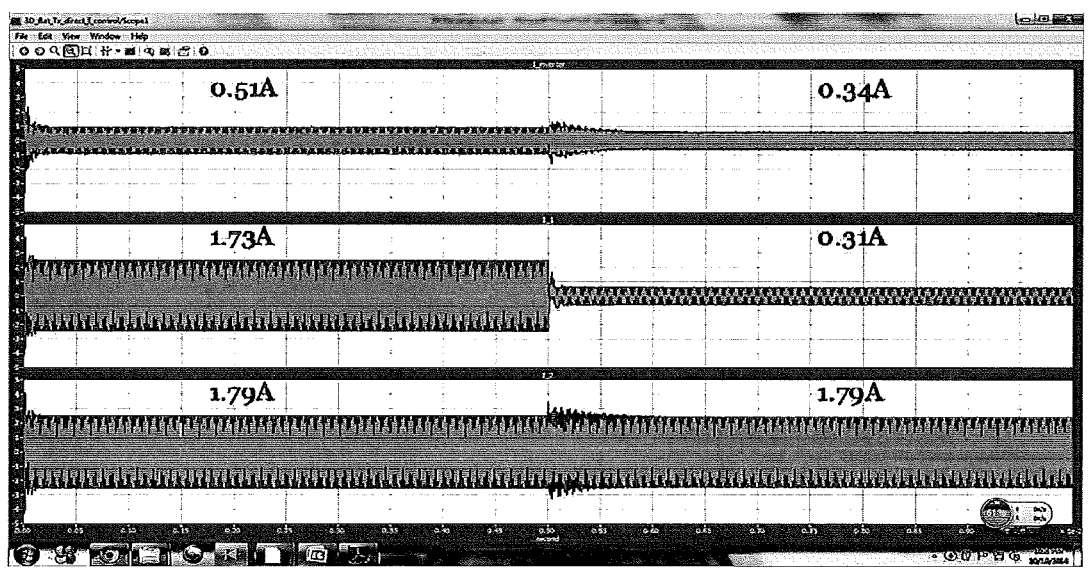
FIGS. 6(a)-(c) are graphs of the waveforms for the first example circuit.
Figure 6B:
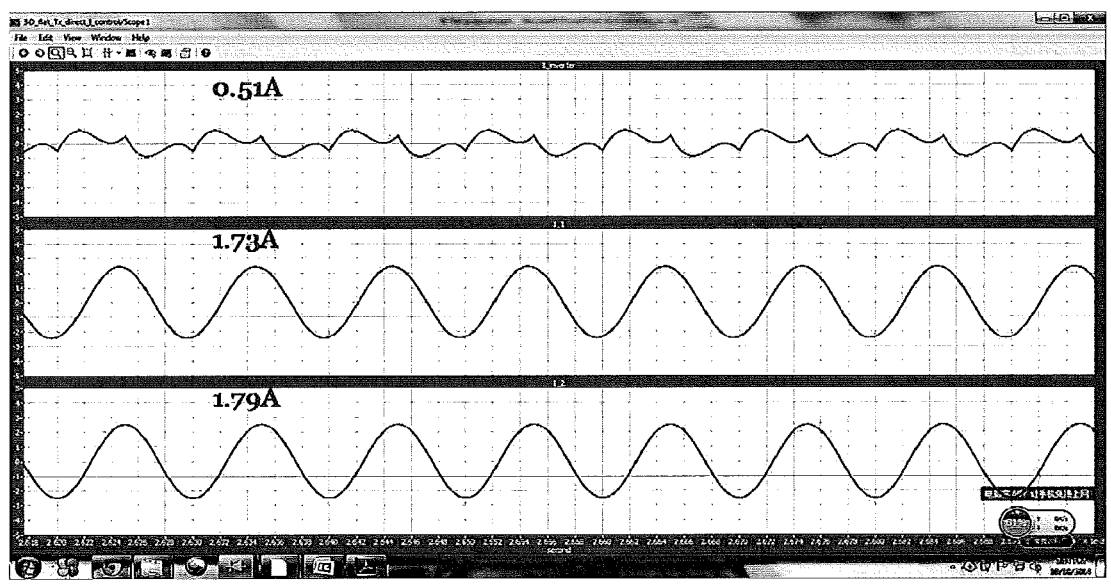
Figure 6C:
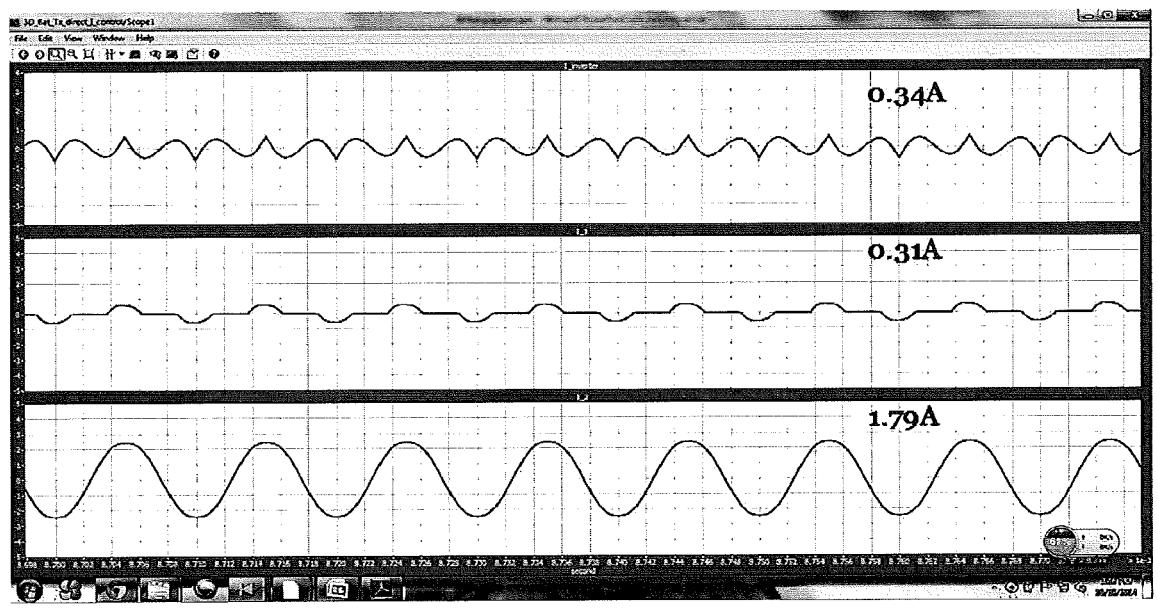

A simulation of the circuit 500 is shown in FIG. 6. FIG. 6(*a*) shows that when the current magnitude in $L_2$ is reduced, the current in $L_3$ stays constant, while the much smaller inverter current reduces slightly. The current waveforms are shown in more detail before the change in FIG. 6(*b*) and after the change in FIG. 6(*c*).

Figure 7:
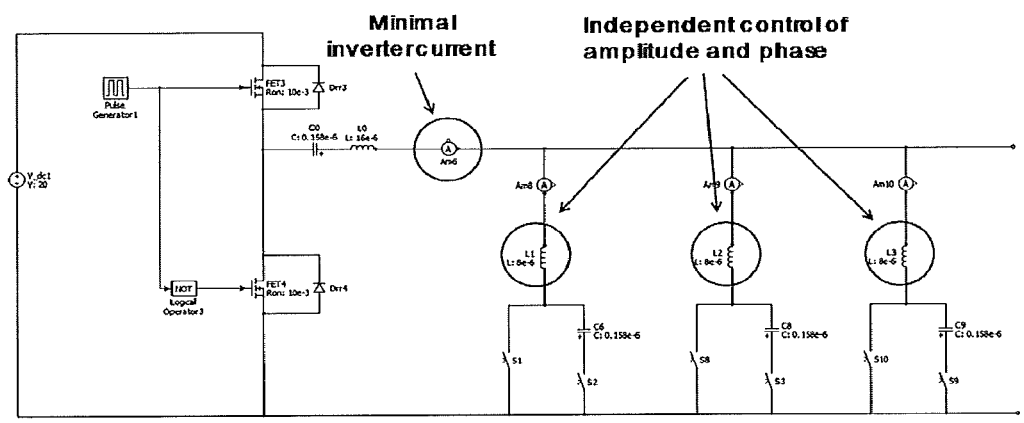
FIG. 7 is a circuit diagram of a second example circuit.

A second example circuit diagram 700 is shown in FIG. 7. The inverter 6 is a half bridge using two MOSFET switches. The inverter 6 supplies an AC voltage to an AC filter $L_0$ $C_0$. Each transmitting coil $L_1$ $L_2$ $L_3$ is connected in parallel to the filtered AC voltage bus. Each coil has one or more control devices associated with it. A first branch includes an AC switch $S_1$ $S_8$ $S_{10}$ to control the coil current magnitude. A second branch in parallel with the first includes a capacitor $C_6$ $C_5$ $C_{10}$ in series with a respective AC switch $S_2$ $S_3$ $S_9$, to control the coil current phase.

Figure 8:
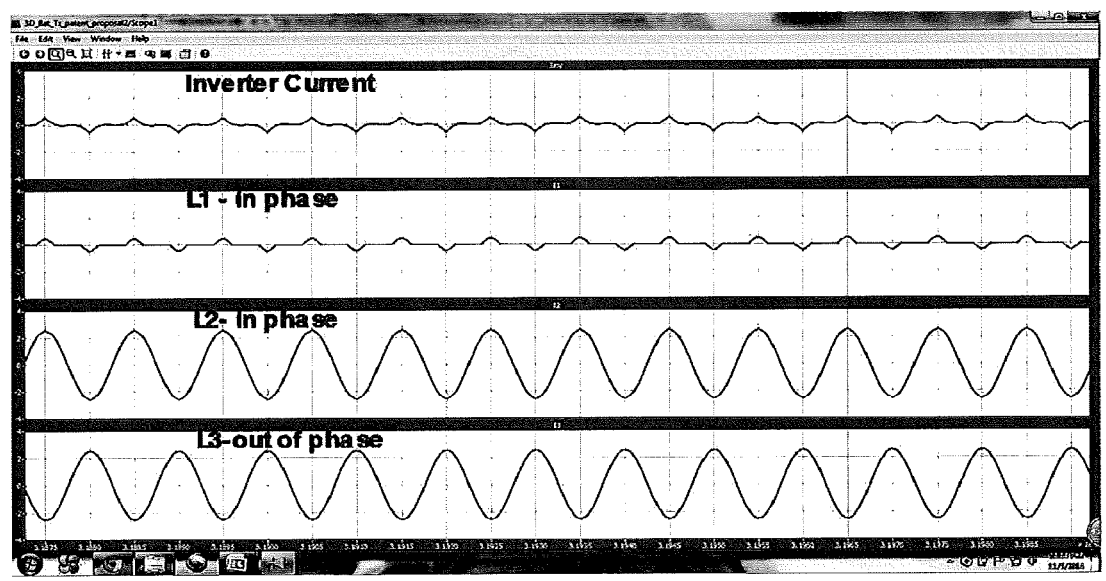
FIG. 8 is graphs of the waveforms for the second example circuit.

A simulation of the circuit 700 is shown in FIG. 8 showing that the current in $L_1$ is in phase with $L_2$, but out of phase with $L_3$.

Figure 9:
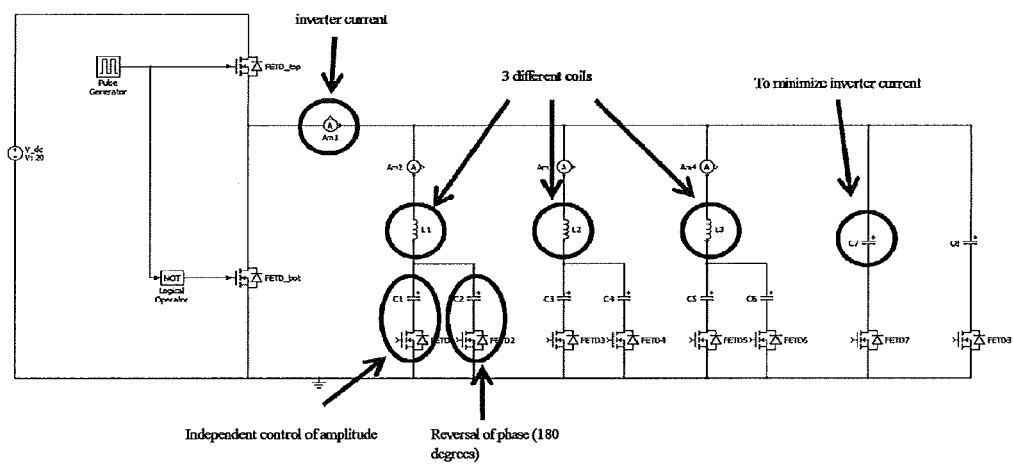
FIG. 9 is a circuit diagram of a third example circuit.

A third example circuit diagram 900 is shown in FIG. 9. The inverter 6 is a half bridge using two MOSFET switches. The inverter 6 supplies an AC voltage. Each transmitting coil $L_1$ $L_2$ $L_3$ is connected in parallel to the AC voltage bus. Each coil has one or more control devices associated with it. A first branch includes an AC switch $FET_1$ $FET_3$ $FET_5$ in series with a capacitor $C_1$ $C_3$ $C_5$ to control the coil current magnitude. A second branch in parallel with the first includes a capacitor $C_2$ $C_4$ $C_6$ in series with a respective AC switch $FET_1$ $FET_3$ $FET_5$, to control the coil current phase. Two compensating capacitors $C_7$ $C_8$ are independently connected in parallel to the AC voltage bus, each in series with a respective AC switch $FET_7$ $FET_6$ to control the capacitor current.

Figure 10:
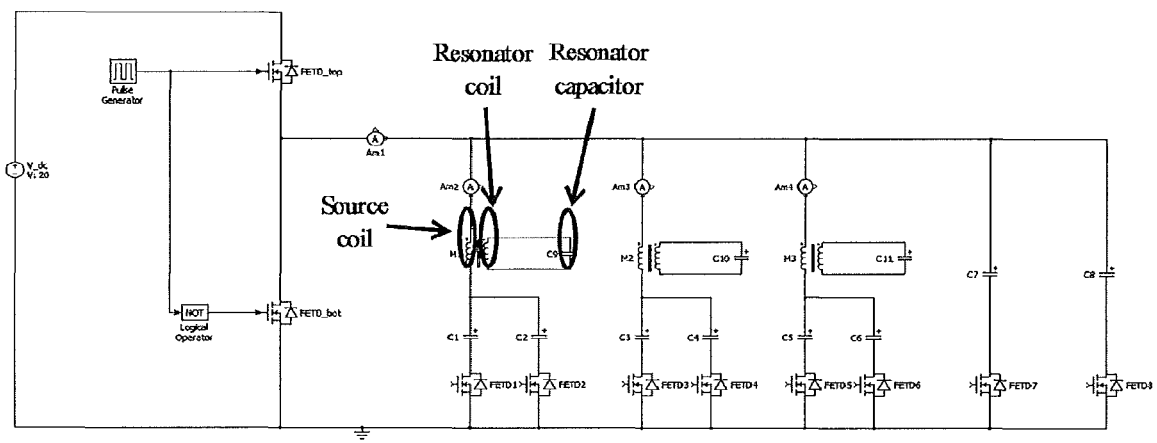
FIG. 10 is a circuit diagram of a forth example circuit.

A forth example circuit diagram 1000 is shown in FIG. 10. The inverter 6 is a half bridge using two MOSFET switches. The inverter 6 supplies an AC voltage. Each transmitting coil $M_1$ $M_2$ $M_3$ is connected in parallel to the AC voltage bus. Each coil has one or more control devices associated with it. A first branch includes an AC switch $FET_1$ $FET_3$ $FET_5$ in series with a capacitor $C_1$ $C_3$ $C_5$ to control the coil current magnitude. A second branch in parallel with the first includes a capacitor $C_2$ $C_4$ $C_6$ in series with a respective AC switch $FET_1$ $FET_3$ $FET_5$, to control the coil current phase. A resonant coil is loosely coupled (k between 0.01 to 0.3, eg: substantially around 0.2) to each transmitting coil, and a compensating capacitor $C_9$ $C_{10}$ $C_{11}$ is connected in series with the resonant coil. Two further compensating capacitors $C_7$ $C_8$ are connected in parallel to the AC voltage bus, each in series with a respective AC switch $FET_7$ $FET_8$ to control the capacitor current.

The resonant coil and compensating capacitor circuit may be tuned to a frequency different than the operating frequency of the transmitter. This may be 1-20% lower than the operating frequency. For example if the transmitter operates at 110 kHz, the resonator may be tuned to 100 kHz. At 110 kHz, the resonator may be simulated as a inductor with a very small inductance. If it is required to be capacitive, then the resonant frequency should be 1-20% higher than the operating frequency. Therefore with a small current flowing in the transmitting coil, a much larger current flows in the resonator coil. This means that the resonator coil provides most of the capacitive compensation current (VA) required to transfer power. Since only a small VA flows in the transmitter coil, it can have a low natural Q without affecting the coupling efficiency too much.

This may allow the inverter switches to be rated at a much lower rating because they only need to switch much smaller currents. The switching losses and conduction losses may be lower. The reflected real load onto the transmitter coil can be detected more easily since its current is much smaller. Also because the resonator circuit only consists of passive components, it is easier to increase the natural Q of the resonator coil.

When the transmitter is close to the receiver (coupling condition is good), the likely presence of ferrite will increase the inductance of coils and automatically reduces the total VA produced. This avoids the likelihood of over-voltage conditions that might occur with too much VA produced.

Figure 11:
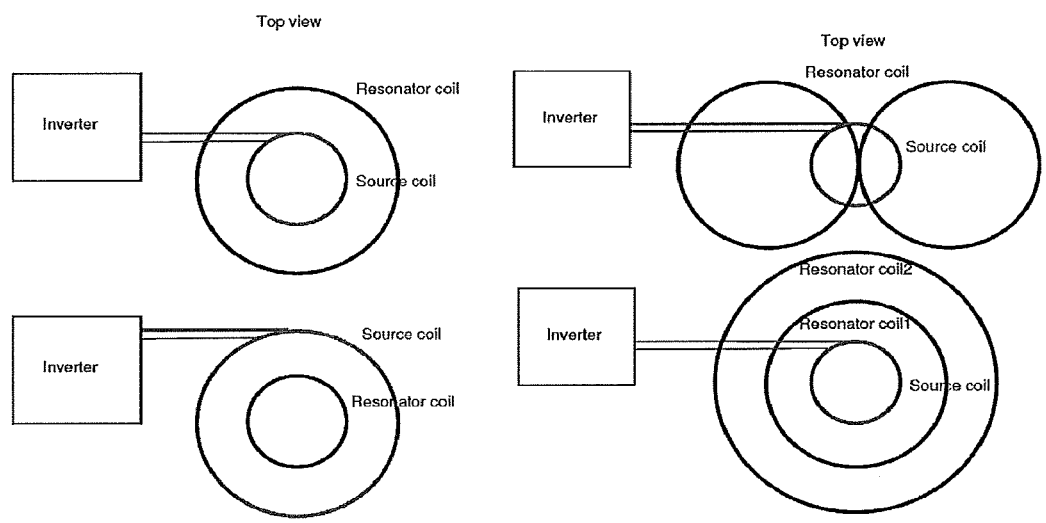
FIG. 11 is example layouts of the transmitting coils for the forth example circuit.

In order to couple the compensating capacitor to the transmitting coil, various different coupling arrangements are shown in FIG. 11. The resonant coil and transmitting coil may be concentric, with one bigger than the other. Alternatively a single resonant coil may overlap multiple transmitting coils. In a further alternative a single resonant coil may be concentric within multiple larger transmitting coils.

Figure 12A:
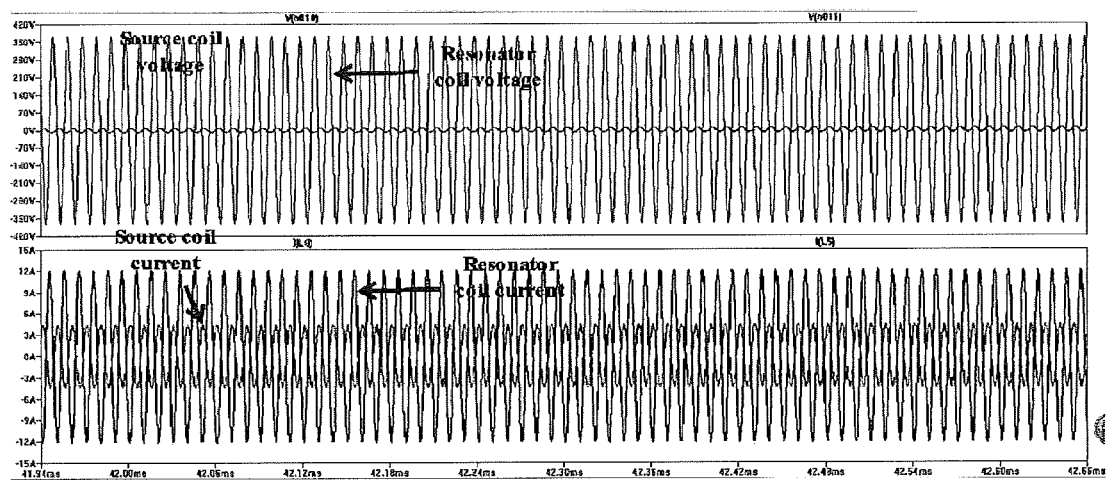
FIG. 12(a)-(b) are graphs of the waveforms for the forth example circuit.
Figure 12B:
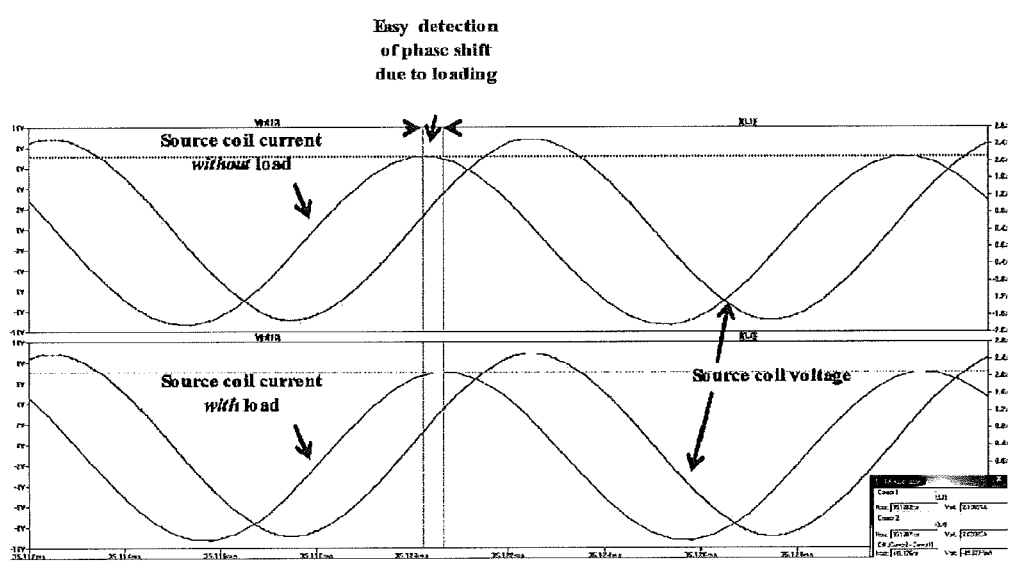

FIG. 12(*a*) shows that the resonant coil voltage is much higher than the transmitter coil, and that the resonant coil current is much higher than the transmitter coil. FIG. 12(*b*) shows that because the transmitter coil current is much lower, it is far easier to detect a phase shift due to different loading conditions.

Figure 13:
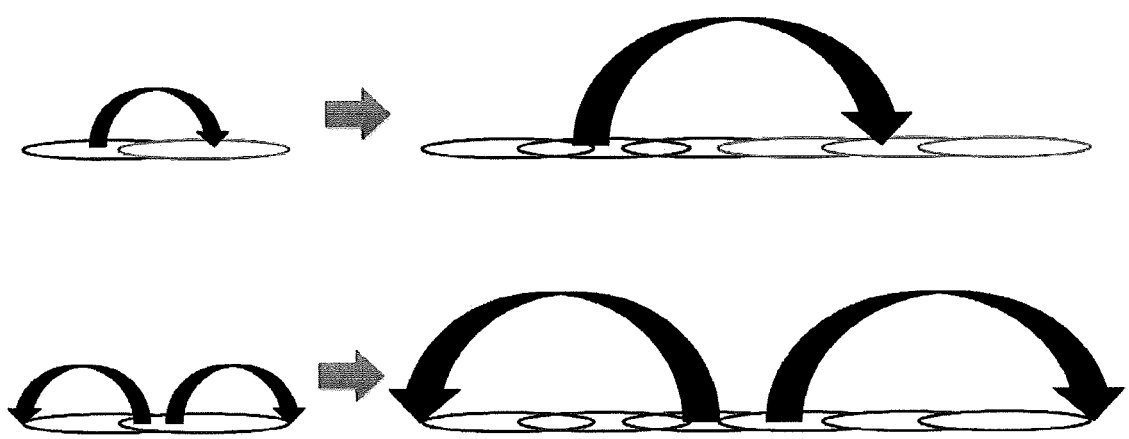
FIG. 13 is field diagrams for operation of the transmitter to achieve greater z height.

FIG. 13 shows that the control over the coil currents also allows the coils to mutually reinforce their fields to generate an overall higher field height (z), orthogonal from the charging mat surface. This allows devices to be charged from a greater distance.

Figure 14:
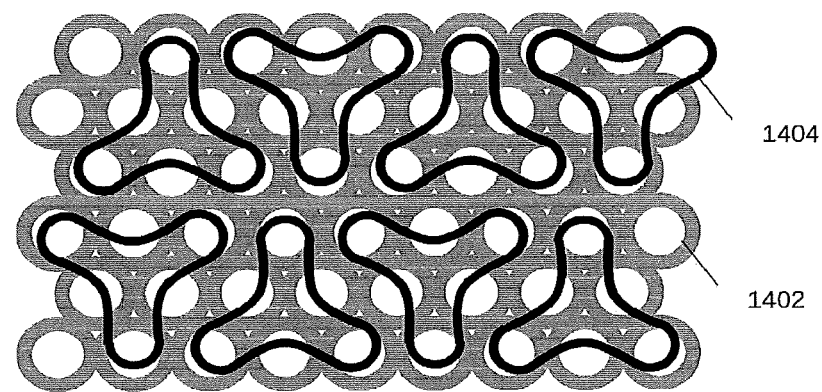
FIG. 14 is a schematic view of an example source coil and resonator coil implementation.

A further embodiment is shown in FIG. 14. In summary an array of resonator coils provides a field to the receiver. The resonator coils may be coupled to source coils which energise the resonator coils. The height of the coils is decreased and packing density may be increased in order to maximise the field and coupling to the receiver. Similarly the resonator coils may be kept small and high in number to give a high specificity or resolution over the generated field. This may in turn allow practical coupling to a commercially viable receiver in an indeterminate orientation, or even higher z height applications. By limiting the switch mode switching to the lower current source coil, the switching losses may be minimised. The loss in the resonant coil is therefore limited to the $R_{ds\_on}$ of the switch. The switch for each resonant coil may be termed a non regulating switch.

The array of resonator coils 1402 is shown in a staggered array. Subgroups of 6 resonator coils are assigned or associated to each source coil 1404. The subgroups are generally triangular arrays. Each resonator coil is approximately circular. Each source coil is approximately triangular.

In order to ensure that the field from the source coil couples each resonator coil equally, and so that the field generated by each resonator coil in turn is equal, no matter it's location, the source coil shape should be designed according to a desired field distribution. For example for resonator coils nearer the centre of the source coil, where the field density is higher, the source coil should overlap less, and where it is lower, further out they should overlap more. For a triangular subarray, the source coil may be an approximately boomerang shape as seen in FIG. 14.

The shape of the source coil can be designed according to the requirements of the application. For example an initial design consideration is the lay out of the resonant coils. For a staggered array of resonant coils a generally triangular shape is relatively efficient. However if the resonant coils are laid out in square fashion, then a square shaped source coil may be appropriate.

During manufacturing the resonant coils might be formed and arranged first, e.g. tightly packed with no gap in between. The source coil geometry can be optimised using magnetics simulation software, taking into account expected manufacturing tolerances. Based on the optimised geometry a customised bobbin may be fabricated eg: CNC machined or 3D printed, on which the source coil can then be wound. Then the wound source coil can be mounted on top of the resonant coils.

The design of the source coil may be to ensure that the magnetic field within each resonator coil is substantially similar. In this context substantially similar will depend on the requirements of the application. For example in a typical consumer charging mat application a difference in coupling coefficient of less than 10% may be considered substantially similar.

The resonator coils are terminated with capacitors in series and the resonant frequency is chosen to be near the IPT operating frequency. How close the tuned frequency is to the operating frequency determines how much VAR flows in the resonator coil. The closer the two frequencies are means the lower the resonator circuit impedance is, and therefore VAR can be increased or "resonated up"—thus the name resonator coils. The use of two types of coils allows a lower VAR to flow in the source coils and therefore lower switching losses for each source coil. On the other hand, a much higher VAR flows in the resonator coils without the associated high switching losses.

Some embodiments provide a single layer array of source coils and an single layer array of resonator coils proximally located and arranged such that the source coils are magnetically coupled to one or more resonator coils. In further embodiments further layers or arrays of resonator (or source) coils may be added. One or more inverters are electrically coupled to the source coils, either individually, in sub-groups, or with one inverter powering all source coils. Energising of one or more resonator coils may be achieved by switching of source coils, and/or selective switching of the resonator coils.

In order to maximise the power delivered to the receiver and the efficiency of the transmission a number of contradictory design factors may therefore be considered, depending on the application.

On possible consideration is to maximise the quality factor or Q for both source and resonator coils, because this equates to lower losses, and therefore better coupling efficiency. High Q is more important for resonator coil because it sources the majority of the reactive power VAR. The resonator coil Q may be at least 100, anything lower than that may mean coupling efficiency could be lower than 50% in very low coupling conditions.

In relation to one or more of the embodiments described herein, it is not likely that Q will be greater than 400. To get a high Q a lower resistance wire needs to be used. If the coil height: is too large, the coupling coefficient drops because lower part of the coil is further from the receiver coil and contributes less. In an embodiment the maximum height is about 5 mm for the resonator coil size 20 mm in diameter. A disadvantage with making coils thinner is that the coil Q is likely reduced (either by thinner wire or by less turns), so minimum height may be about 1 mm.

In order to get a desired resolution for the field it may be desirable in some applications to maximise the number of coils, but yet ensure that a sufficient portion of ferrite core within the centre of both the resonator coils, and the sources coils. Additionally the higher the number of resonator coils the higher the component count, and the higher the complexity of the optimisation problem for which coils and how to energise them.

The resonator coil size may be chosen based on the receiver size. The combined area of the energized resonator coils (one or multiple) should be around the same size as the receiver coil in order to maximize coupling coefficient. For example with a 32 mm×48 mm receiver coil, a prototype resonator coil diameter was chosen to be 20 mm; with 2 turned on at a time which makes up an area around 20 mm×40 mm. With larger coils, fewer coils need to be on together (eg if diameter is 40 mm, only 1 resonator coil needs to be on), however flexibility and spatial resolution is reduced. On the other hand, coils cannot be too small, because while more coils can always be turned on together to create any equivalent coil size desired, more smaller coils means the total current path is much longer and therefore the losses are higher. Therefore in most applications 4 or less coils should have similar total area as the receiver coil.

Figure 15:
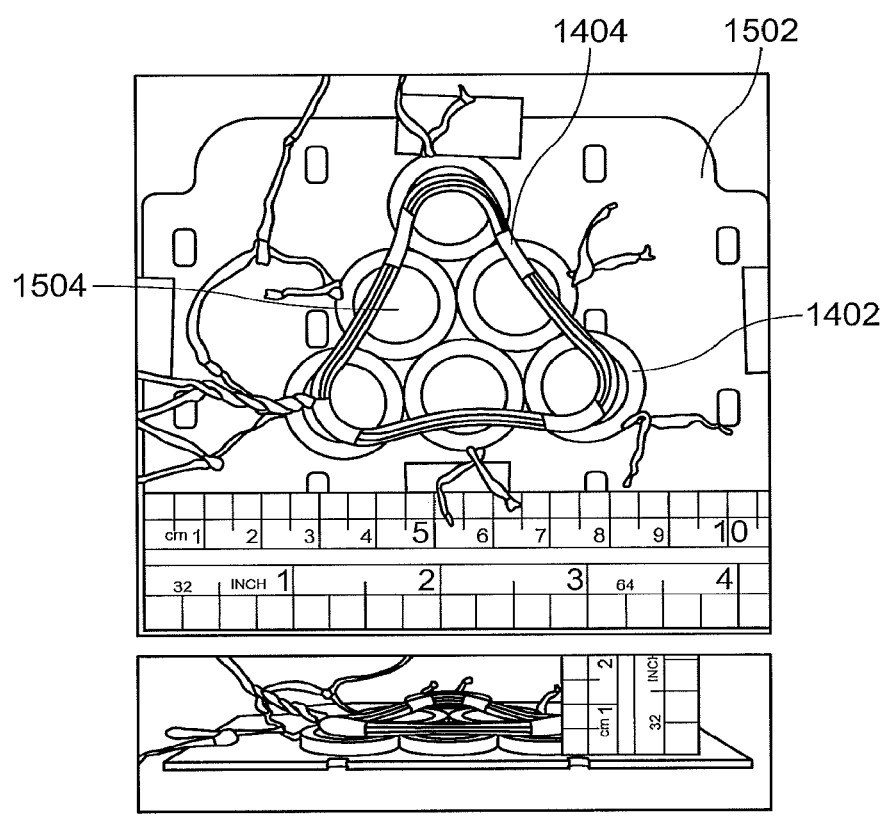
FIG. 15 is perspective view of a prototype source coil and resonator coil implementation.

An example configuration is shown in FIG. 15. In this example the source coil has 1-10 turns of 1 mm diameter wire and the resonator coil is 5-25 turns of 100 strand 0.063 mm litz wire.

The source and resonator coils are most likely to be would wire coils, although other coils types as mentioned above may be used depending on the application. Also a ferrite backplane 1502 with protruding cores 1504 may be used to improve coupling and efficiency. The source could may be underneath the resonator coils or on top (as shown in FIG. 15), depending on the requirements of the particular configuration.

Because of the combination of a single source coil and multiple resonator coils, the system may be relatively sensitive to component tolerances. Because the resonator coils are substantially tuned to the operating frequency, changes in tolerances are reflected in large variations in impedance and VA etc. For this reason, the VAR of the resonator should not exceed that of source coil by too much (e.g. larger than 10) because this makes the circuit too sensitive. If VAR of resonator is higher than VAR of source by only about 5 times, component tolerances of up to about 10% should still be feasible to design for.

Figure 4A:
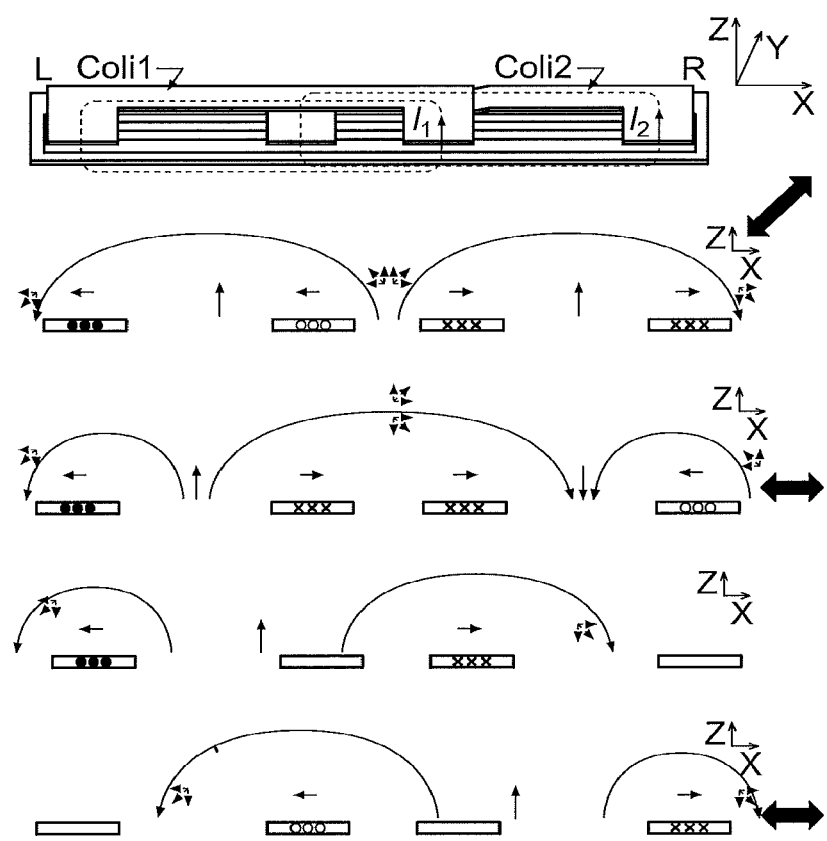
FIGS. 4(a)-(d) are field diagrams for operation of the transmitter in FIG. 2.
Figure 4B:
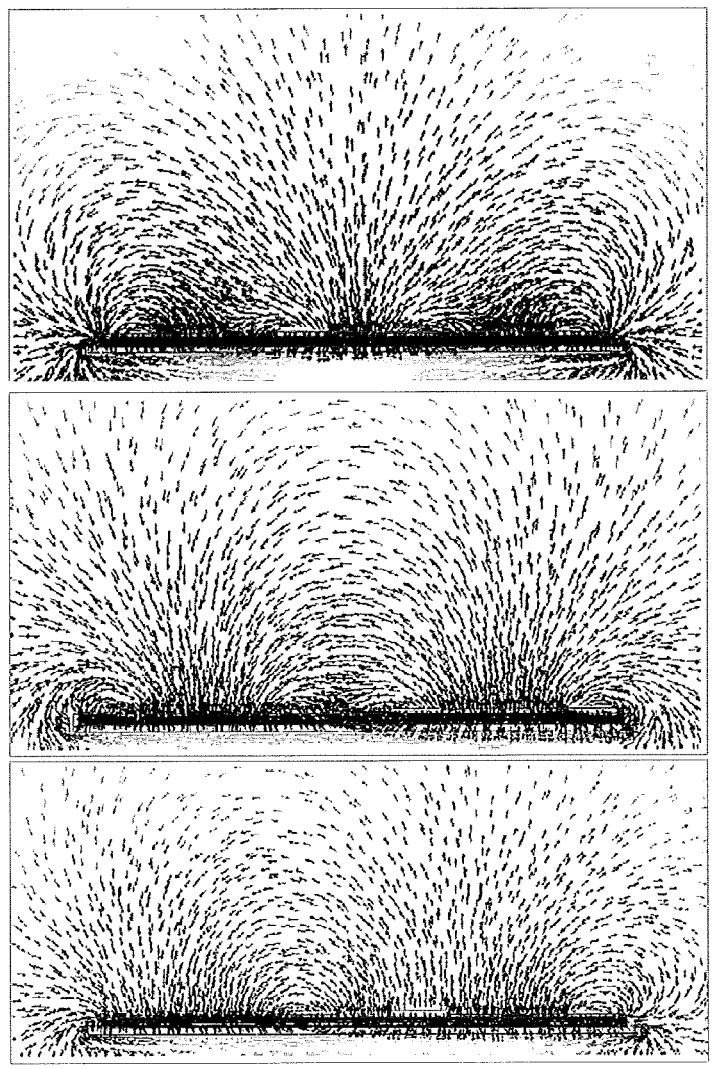
Figure 4C:
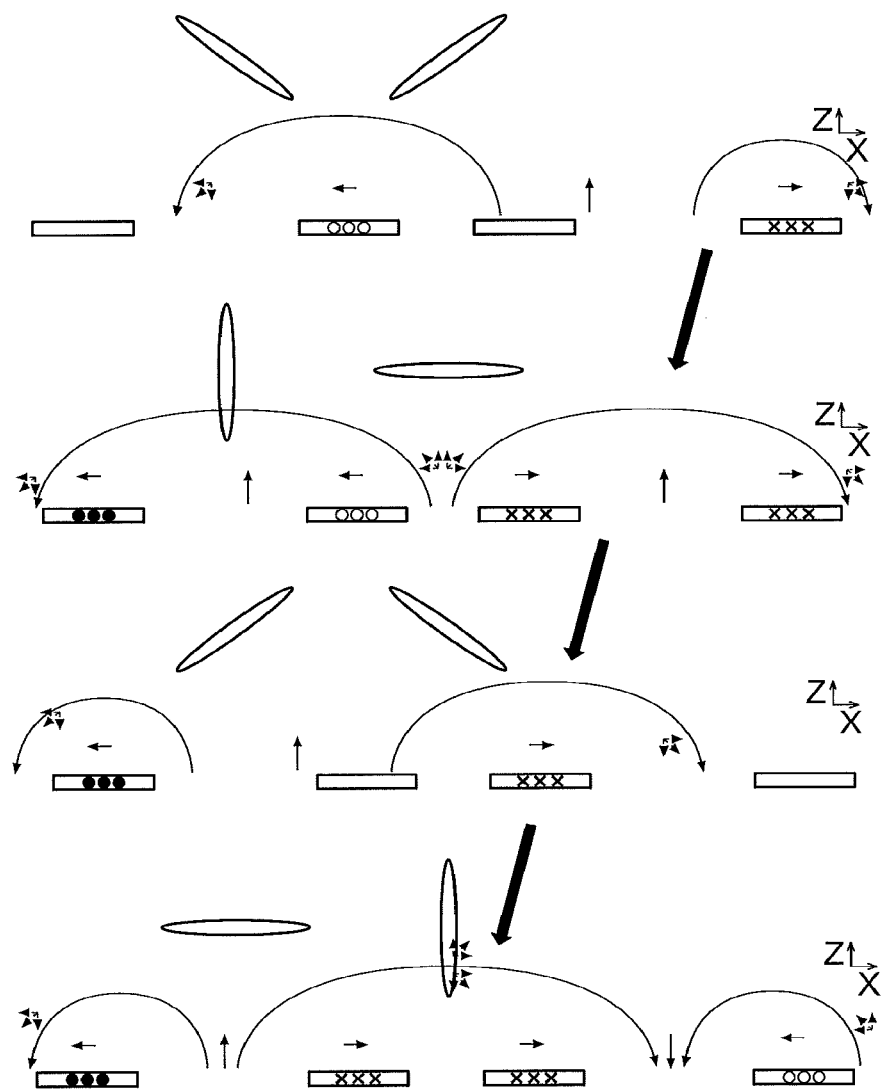
Figure 4D:
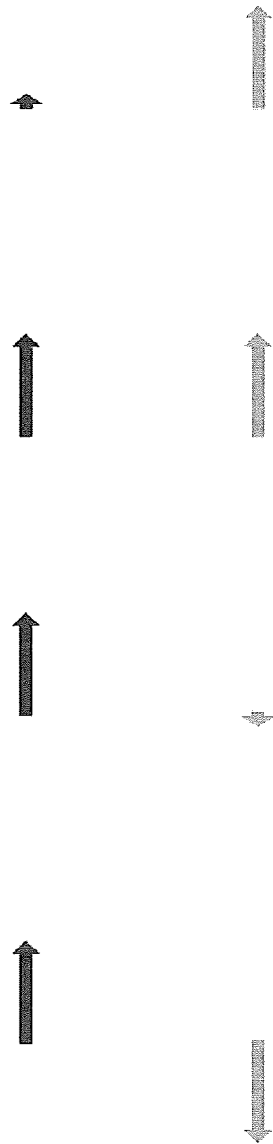
Figure 16:
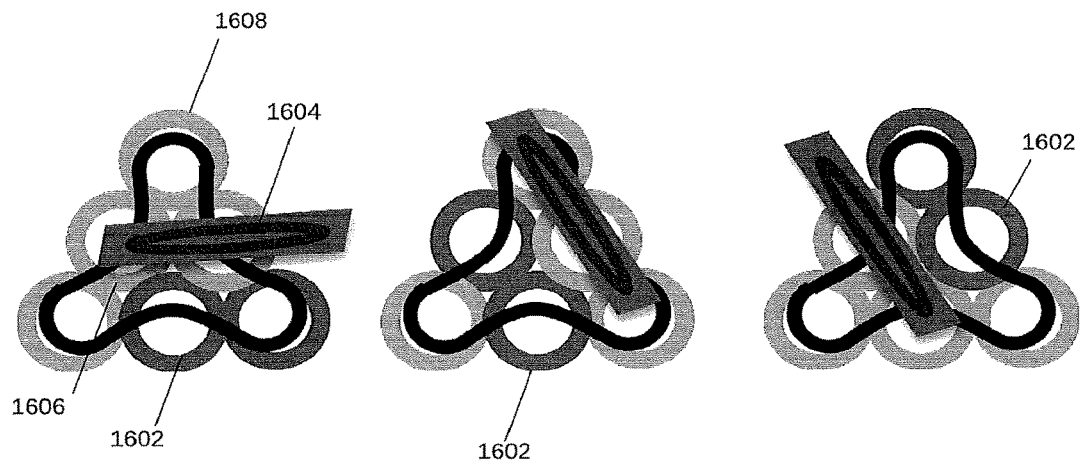
FIG. 16 is a schematic diagram of which coils are energised depending on the receiver location/orientation.

FIG. 16 shows an example control strategy for an array of transmitter coils. It may be used for the resonator coil array in FIG. 14, or a directly switch mode regulated coil array. In FIG. 4c for example the coils either side of the receiver are controlled to maximise the field orthogonal to the receiver. Given the receiver is likely to have shielding for the electronics and/or ferrite cores, an alternative approach is to only energise coils on one side of the receiver.

The worst case scenario for indeterminate receiver orientation, is the receiver power receiving coil orthogonal to the power transmitting coils. As the primary field from the power transmitting coils is normally predominantly orthogonal, this means that very little is coupled to the power receiving coil in this worst case orientation. In this alternative approach, because only coils on one side of the receiver are energised, this allows the field the opportunity to change direction on its return path, to the point where enough is orthogonal to the power receiving coil for effective coupling. A substantial portion of the flux may be said to coupled to the receiver even in the vertical orientation. Substantial in this context will vary according to the application. In a consumer charging mat for example, it may mean a coupling coefficient of at least 30% of what the expected best case coupling coefficient for a horizontal orientation.

FIG. 16 shows that two resonator coils 1602 are energised on one side of the receiver 1604 in order to generate a horizontal flux component entering the receiver in order to couple a vertically oriented coil. In this arrangement coils, adjacent on one side, to the coils directly underneath the receiver, are energised. This first adjacent row may be energised, or a plurality of adjacent rows may be energised. The flux entering the receiver from one side (the coil side of a Smartphone for example) enables coupling whilst avoiding exposing electronics components on the other side to excessive flux. This may be enhanced by the use of shielding in the receiver between the coil and electronics. This advantage can be further enhanced by not energising overlapping coils or coils underneath 1606 the receiver, and/or no coils on the back side of the receiver 1608 are energised; as this may also avoid power losses associated with generating flux which would not be effectively coupled to a vertically oriented receiver coil.

Alternatively, resonator coils on either side of the receiver may be energised in order to strengthen the horizontal flux through the receiver's vertically oriented coil. Again the coil(s) directly underneath the receiver can be switched off. Such an arrangement may be suitable for receivers in which the electronics are sufficiently shielded and/or the coil is not backed by electronics.

These arrangements allow for simple inverter and switching circuitry, because only coils need to be selectively switched rather than arranging for control of phase for each energised coil.

It will be understood that whilst an example has been described with respect to vertically oriented receiver coils, the skilled person will appreciate that such arrangements will also be suitable for partially vertically oriented receiver coils. Furthermore although the use of both source and resonator coils provides for simpler inverter design and/or reduced switching losses, embodiments energising coils to one or either side of a receiver could be implemented using source coils only without resonator coils.

Receiver location and orientation may be determined in a number of ways, for example using a foreign object detection array and correlating the received signals with metal such as might encompass a Smartphone, and a coil and the relative strength of its coupling. Alternatively an "allowed" receiver may emit signals such as RFID from different transmitters allowing a charging matt to determine that it is an allowed device and its location and orientation, before energising appropriate source and/or resonator coils to achieve a flux through the receiver aligned substantially orthogonal to the receiver coil orientation in order to maximise magnetic coupling. The receiver coil orientation may be determined from the receiver orientation, it may be communicated via a type or model of receiver, and/or it may be determined from coupling with the transmitter coils.

In some practical circumstances it may be the case that a receiver is not optimally orientated for a simple energising of coils to one side, and no energising of coils underneath. For example in the middle drawing of FIG. 16, the receiver may lie across the three right-most coils but also be more angled to also lie partly across the top energised coil. In this situation the same coils may be energised even though this would introduce some vertical flux through the receiver. Alternatively the bottom left-most coils may be energised in order to avoid an increase in vertically oriented flux. Optimisation of such situations can be achieved according to the requirements of the application.

Whether to energise coils for horizontal (to the side(s) of the receiver) or for vertical (underneath the receiver) or a combination can be determined by the orientation angle of the receiver coil. For example a substantially 45 degree angle (eg 35-55 degrees) may result in coils underneath the receiver as well as the first adjacent row of coils to one side being energised.

In order to determine which coils to turn on in a given situation, it may be desirable to either determine the receiver location and/or orientation, or to iterate coil combinations towards an optimised solution. Alternatively a lookup table may be used.

For example the transmitter may include an object detection system (e.g. another coil dedicated for object detection) to detect objects near the Tx surface. Once an object is detected and its rough location is known, then the nearby source coil can be turned on. If the object is far away from the Tx surface, then different source coils and different combinations of resonator coils might be tested until a maximum power transfer is determined. If the object is close to the Tx surface and too much VA is generated by the resonator during the detection phase, a alternative detection sequence could involve a gradual ramp up of the source coil, or that resonator coils are not initially turned on until it is determined that there are no objects that are too close.

Figure 17:
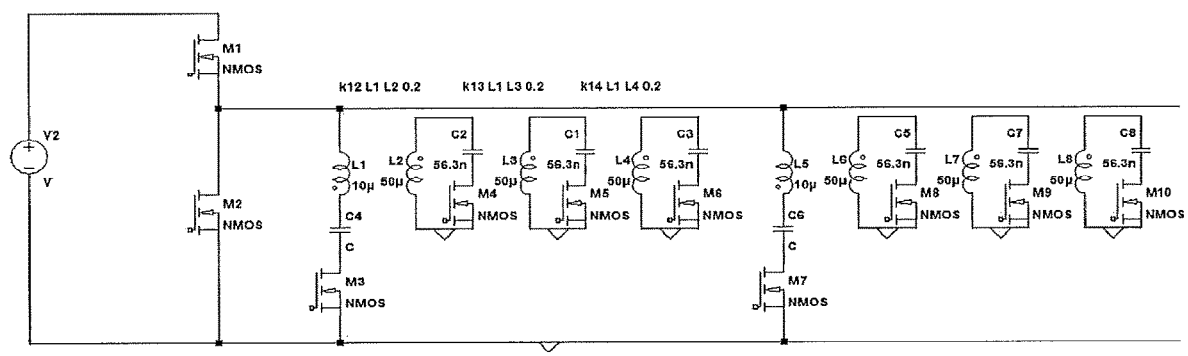
FIG. 17 is a circuit diagram of a transmitter according to a further embodiment.

An example circuit to control a series of source coils and resonator coils is shown in FIG. 17. Two sets of source coils are shown, although this could be extended to any configuration. Each source coil (L1, L5) is coupled to three resonator coils (L2 L3 L4, L6 L7 L8). To turn on the source coil L1, M3 is turned on, current then flows through L1. Depending on which combination of resonator coils to turn on, their respective series MOSFET is turned on. E.g. to turn on L2, M4 is switched on. The magnitude of the current in both the source and resonator coils can be adjusted by the duty cycle of the switching M3 at the IPT frequency.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transmitter comprising:
   a switch mode inverter;
   one or more source coils selectively electrically driven by the switch mode inverter;
   a plurality of resonant coils magnetically coupled to the source coils but not electrically connected to the switch mode inverter; and
   a controller configured to selectively energize at least one the source coils and optionally enable one or more associated resonant coils;
   wherein a substantially similar magnetic flux is coupled from at least one of the one or more source coils to two or more of the resonant coils.

2. The transmitter in claim 1 wherein each source coil is associated with two or more resonant coils.

3. The transmitter in claim 2 wherein a coupling coefficient between each source coil and each of the associated resonant coils varies by less than 10%.

4. The transmitter in claim 1 wherein perimeters of each of the resonant coils are substantially closely spaced.

5. The transmitter in claim 4 wherein the spacing is 0-5 mm.

6. The transmitter in claim 2 wherein each source coil is arranged over the associated resonant coils, and covers a greater portion of a given resonant coil in an area of lower source coil flux density, and a lower portion of a given resonant coil in an area of higher source coil flux density.

7. The transmitter in claim 2 wherein the associated resonant coils comprise between 3 to 10 coils arranged in a staggered array, and the source coil is arranged within the array.

8. The transmitter in claim 1 wherein at least one source coil is energized by the switch mode inverter according to an inductive power transfer frequency and a duty cycle determined by the controller.

9. The transmitter in claim 8 wherein the controller is configured to determine at least one of the duty cycle and which resonant coils are optionally enabled according to one or more of a receiver location, a receiver orientation, a power transfer optimization algorithm, and a lookup table.

10. The transmitter in claim 1 wherein at least one source coil is energized by the switch mode inverter according to an inductive power transfer frequency determined by the controller.

11. The transmitter in claim 1 wherein at least one source coil is energized by the switch mode inverter according to a duty cycle determined by the controller.

12. An inductive power transmitter comprising:
a single layer array of source coils;
a single layer array of resonant coils magnetically coupled to the source coils; and
wherein one or more source coils are selectively energized and one or more associated resonant coils are optionally enabled depending on at least one of a receiver location, a receiver orientation, a power transfer optimization algorithm, and a lookup table; and
wherein the source coils are energized by a switch mode inverter, according to an inductive power transfer frequency and a duty cycle.

13. The transmitter in claim 12 wherein the resonant coils are enabled by a switch.

14. The transmitter in claim 12 wherein the resonant coils have a Q value of at least 100.

15. The transmitter in claim 12 wherein the resonant coils are between 0.5 mm-5 mm in height.

16. An inductive power transmitter comprising:
one or more transmitter coils selectively electrically driven by an inverter;
a plurality of resonant coils magnetically coupled to each of the one or more transmitter coils but not electrically coupled to the inverter; and
a controller configured to selectively energize one or more transmitter coils using the inverter and to optionally selectively enable one or more associated resonant coils using one or more corresponding switches;
wherein only resonant coils on a single side of a receiver device are enabled.

17. The transmitter in claim 16 wherein the controller is configured to selectively energize one or more transmitter coils and to optionally selectively enable one or more associated resonant coils responsive at least in part to one or more of a receiver location, a receiver orientation, a power transfer optimization algorithm, and a lookup table.

18. The transmitter in claim 16 wherein a substantially similar magnetic flux is coupled from at least one of the one or more transmitter coils to two or more of the resonant coils.

19. The transmitter of claim 16 wherein each transmitter coil is associated with two or more resonant coils.

20. The transmitter in claim 19 wherein the associated resonant coils are arranged in a staggered array, and the transmitter coil is arranged within the array.

21. The inductive power transmitter of claim 16 wherein one or more source coils is energized by a switch mode inverter according to an inductive power transfer frequency determined by the controller.

22. The inductive power transmitter of claim 16 wherein the one or more source coils is energized by a switch mode inverter according to a duty cycle determined by the controller.

23. The inductive power transmitter of claim 16 wherein the one or more source coils is energized by a switch mode inverter according to an inductive power transfer frequency and a duty cycle determined by the controller.

24. An inductive power transmitter comprising:
one or more source coils;
a plurality of resonant coils magnetically coupled to the source coils; and
wherein a substantially similar magnetic flux is coupled from at least one of the one or more source coils to two or more of the resonant coils; and
wherein perimeters of each of the resonant coils are substantially closely spaced.

25. The transmitter in claim 24 wherein the resonant coils are between 5 mm-50 mm in diameter.

26. The inductive power transmitter of claim 24, wherein:
the resonant coils are smaller than the source coils; and
one or more source coils are selectively energized and one or more associated resonant coils are optionally selectively enabled depending on one or more of a receiver location, a receiver orientation, a power transfer optimization algorithm, and a lookup table.

27. The inductive power transmitter of claim 26 wherein the resonant coils are selectively enabled by a switch.

28. The inductive power transmitter of claim 26 wherein one or more source coils is energized by a switch mode inverter according to an inductive power transfer frequency determined by a controller.

29. The inductive power transmitter of claim 26 wherein the one or more source coils is energized by a switch mode inverter according to a duty cycle determined by a controller.

30. The inductive power transmitter of claim 26 wherein the one or more source coils is energized by a switch mode inverter according to an inductive power transfer frequency and a duty cycle determined by a controller.

* * * * *